2,768,754

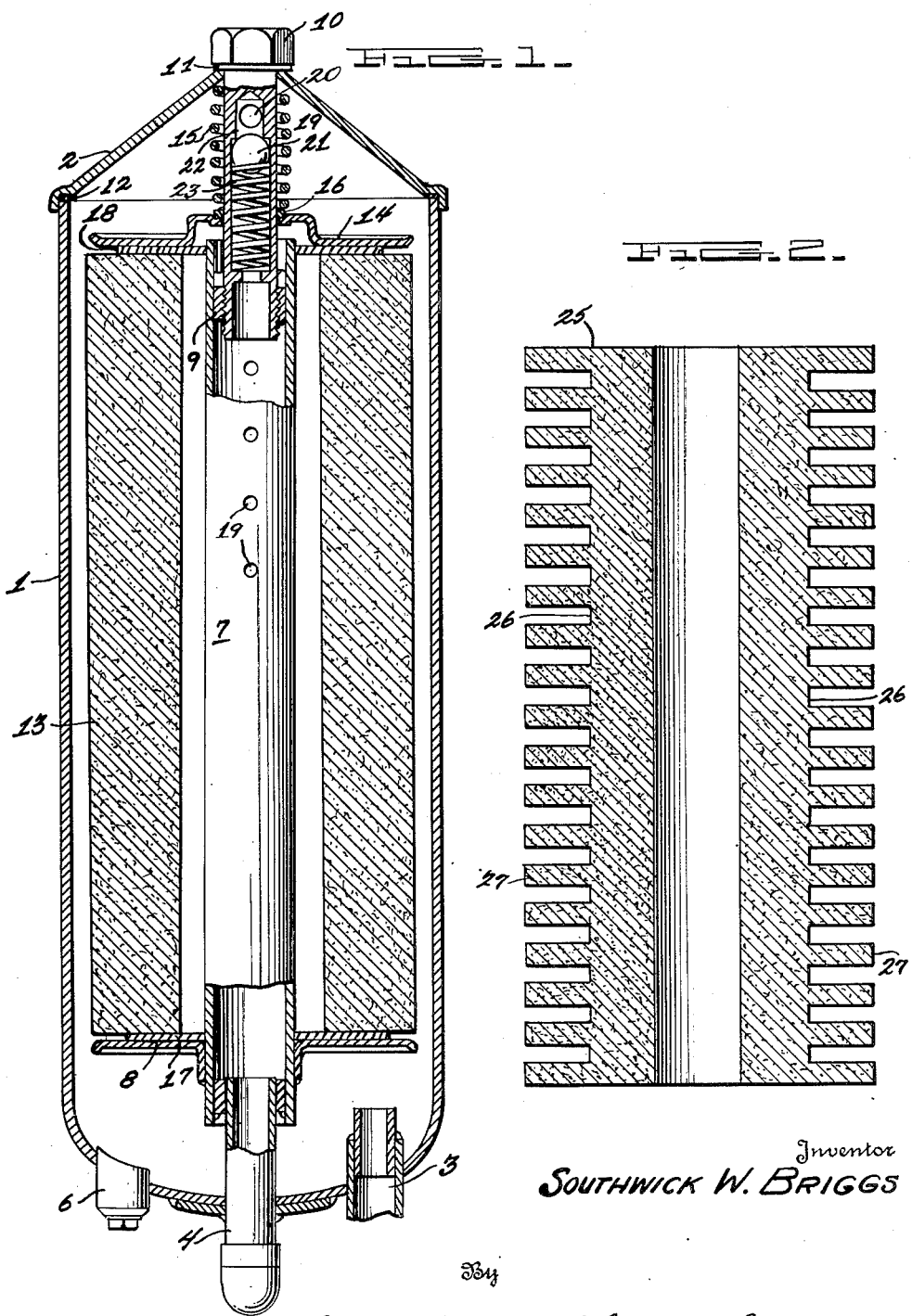
Oct. 30, 1956 — S. W. BRIGGS — 2,768,754
BONDED SAWDUST FILTER MEDIUM
Filed Aug. 12, 1949
Inventor
SOUTHWICK W. BRIGGS United States Patent Office 2,768,754
Patented Oct. 30, 1956

BONDED SAWDUST FILTER MEDIUM

Southwick W. Briggs, Bethesda, Md.

Application August 12, 1948, Serial No. 43,797

18 Claims. (Cl. 210—205)

This invention relates to the art of filtration of fluids and more particularly to a novel filter medium of bonded sawdust and a method of manufacturing the same.

The widespread use of internal combustion engines has created a demand for a filter for the removal of impurities from the oil used in the lubrication of the engines. The filters should be cheap and compact and still have the ability to remove large quantities of sludge from the oil before becoming plugged, and yet allow a high rate of flow of the fluid therethrough. Ordinarily, a high dirt capacity may be obtained only if a large portion of the impurities are deposited within the filter medium rather than merely on its inlet surface. However, it is essential that the filter remove the impurities from the fluid. It has generally been necessary to provide rather complicated, expensive structures to obtain both a high capacity and effective removal of impurities.

It is essential that filters for widely used equipment such as automobiles be rugged and capable of withstanding the rough handling which it encounters in garages and in shipment. Of course, the filter material must also be resistant to any solvent or corrosive action of the fluid being filtered and the temperatures existing during the filtration operation. The filters usually available having a high capacity have little physical strength and must be handled with care. This is especially true of filter cartridges comprising a stack of discs in which a harness must be provided to maintain the cartridge in a tightly compressed condition, thereby increasing the cost of the filter.

It is an object of this invention to provide a filter medium prepared from sawdust bonded into the desired shape with a resin.

Another object of this invention is to provide an efficient filter medium having a high dirt capacity.

A further object of this invention is to provide a filter medium of sawdust bonded with a resin to form a porous block having a high mechanical strength.

Still another object of this invention is to provide a filter medium for the filtration of lubricating oils capable of withstanding the temperatures and materials encountered in the filtration of lubricating oils for internal combustion engines for extended periods.

It is also an object to provide a highly efficient filter medium which may be prepared at a low cost from materials readily available in large quantities.

With these and other objects in view, as will become apparent in the following description, this invention resides in the bonding of sawdust with a resin to form a strong porous, rigid block through which a fluid may be passed for the removal of impurities.

In the drawings:

Figure 1 is a vertical cross-sectional view of a filter constructed according to this invention; and, Figure 2 is a vertical cross-sectional view of a modified form of the filter mass prepared according to this invention.

In the preparation of filter material according to this invention, sawdust from any wood-working operation producing a material of the proper particle size may be employed. A typical sawdust which may be employed is designated as 20–F and is prepared by passing ordinary sawdust through a 20 mesh screen to remove the large chips. The material passing through the screen is a wide cut ranging from relatively large particles to very fine material. The fine material increases the strength of the bonded filter material, but the amount present must be limited to retain the proper porosity of the finished block. Satisfactory filter materials have been prepared from pine, fir, oak, and briar sawdusts and undoubtedly may be prepared from other woods.

In order to obtain accurate control of the properties of the filter medium prepared according to this invention it will generally be desirable to use sawdust having a controlled particle size. While the material which is merely screened through a 20 mesh screen is satisfactory, the properties of the resultant products will vary between rather wide limits because of the variation in the size and quantity of fines. It is preferred, therefore, to use a mixture of a number of cuts of the sawdust having fixed minimum as well as maximum particle sizes. For example, a mixture of sawdust in which 90% of the material has a particle size of 20–60 mesh and 10% of the material has a particle size of 92–110 mesh will produce a filter medium having properties approximating that of 20–F sawdust.

The sawdust used is essentially granular in shape, and when subjected to pressure in the manufacture of the block merely packs and does not flow to form a dense continuous mass. In contrast with fine fibrous particles, the sawdust allows the formation of a porous material through which a liquid may be readily passed, rather than a dense, impervious mass of plastic.

The sawdust is mixed with a resin which binds the sawdust into a strong, coherent, unitary mass of the desired shape. The granular shape of the sawdust particles does not permit interlacing of the particles in the manner that fibers are interwoven in the manufacture of paper; consequently, the bonded block of sawdust depends on the resin for its physical strength. Resins which have been found especially satisfactory are phenol-formaldehyde, phenol - furfural, melamine - formaldehyde, resorcinol - formaldehyde, lignin, and mixtures of urea-formaldehyde and melamine.

Generally, any resin which becomes tacky before setting and will bind the sawdust into a strong mass is satisfactory, but the particular resin used will depend upon the use contemplated for the filter. In the filtration of lubricating oils for internal combustion engines it is necessary that the resin employed to bond the sawdust be capable of withstanding temperatures of about 200° F. and water at that temperature for extended periods. The hot press or high-temperature setting resins of the types listed above and the intermediate temperature setting resins are excellent for this use. In most cases the cold setting resins, thermoplastic, and the natural occurring resins such as Manilla, Coumar, etc. will soften at temperatures below 200° F. and are not satisfactory for the filtration of hot lubricating oils. However, they may be used for filtering cold fluids provided they will withstand the chemical and solvent action of the fluid.

In the preferred method of preparing the filter medium the sawdust is mixed with a dry resin powder to avoid the formation of a sticky mass, and to extend the time available for working the mixture. The dry resin powder and sawdust mixture may be stored overnight or longer without danger of the resin setting. A phenol-formaldehyde resin which may be readily obtained in the powder form and is especially suitable for this purpose is Amberlite, P. R. 14, prepared by the Resinous Products &

Chemical Co. of Philadelphia, Pennsylvania. Dry resin powder ranging from about 15% to a maximum of 25% of the weight of the sawdust is mixed with the sawdust in a conventional dough mixer until the resin is uniformly distributed throughout the sawdust. The dry mixture is then molded under one-hundred pounds per square inch pressure into the desired shape. It is baked, while held at a constant volume, at a temperature of 300° F. for two hours and forty minutes to set the resin permanently. The exact time and temperature of heating will, of course, depend on the particular resin employed. The Amberlite P. R. 14 resin may be set at temperatures as low as 180° F.

A preferred resin, because of its excellent physical properties and low cost, is a resin prepared from phenol-furfural. It may be used in a dry condition and sets at a temperature of 300–350° F. A resin of this type is prepared by the Borden Co., and identified by S-2151.

The filter medium may also be prepared by mixing the sawdust with a solution of the resin to form a wet mix which may be molded into the desired shape. It is then not necessary to mold the wet mix under pressure. The resin solution should contain 50–75% resin to provide a tacky solution giving a block with sufficient strength prior to heating to hold the molded mixture of resin and sawdust in the desired shape during the subsequent heating operation. A concentrated resin solution of 50–75% is also necessary to prevent migration of the resin to the surface of the molded shape during the heating to set the resin. Although the resin solutions are concentrated, it is necessary to increase the heating period to vaporize the solvents prior to setting of the resin.

The solvent employed in the preparation of the resin solution will depend on the particular resin used. For example, the phenol-formaldehyde resins may be dissolved in water before setting. Lignin may be dissolved in an 8% aqueous ammonia solution or a furfural alcohol solution.

When the filter block is not molded under pressure and baked while held at constant volume, the weight of the resin in the mixture must be increased to approximately 50% of the weight of the sawdust to obtain a block having sufficient physical strength to allow it to be handled. This is in contrast with the 15–25% of the weight of the sawdust which produces blocks of satisfactory physical strength when the dry resin saw dust mixture is molded under pressure. If the mixture of sawdust and resin is not molded under pressure, a more open block is formed and it then becomes necessary to use a sawdust having a finer particle size to obtain the desired filtration.

A filter block four inches in diameter and six inches high having a round hole one and one-half inches in diameter extending axially therethrough was prepared from a dry mix of 20-F sawdust and an intermediate setting temperature phenol-furfural resin, by the method described above, using dry resin powder. A lubricating oil was filtered through the block until the block became plugged. The block removed approximately 800 grams of sludge from lubricating oil before plugging. About 75–80% of the sludge was deposited within the block and the remainder formed a coating on the inlet surface of the block. Even though most of the impurities were deposited within the filter block, the block failed when the lubricating oil would no longer pass through the block because of the sealing of its inlet surface.

A filter block of the same size as that described above, prepared from 90% of a 20-60 mesh cut of oak sawdust and 10% of 92-110 mesh cut of white pine sawdust, removed substantially the same amount of sludge from the lubricating oil as for the 20-F sawdust. The total capacity of the block was substantially unchanged and the proportion of the sludge deposited within the block remained the same. However, a block four inches in diameter and six inches high having a one and one-half inch hole through the center, prepared from an "artificial" sawdust prepared from 50% of 20-60 mesh material and 50% of 92-110 mesh material, and tested in the same manner as the block previously described, only removed 150 grams of sludge from the lubricating oil before it became plugged. Substantially all of the sludge removed from the lubricating oil was deposited on the surface of this block.

Another block having the same dimensions as those described above was prepared from a sawdust made up of 75% 20-60 mesh material and 25% 92-110 mesh material. This block removed 250 grams of sludge from the oil before becoming plugged. Here again, substantially all of the sludge was deposited on the inlet surface of the block.

A filter prepared according to this invention is illustrated in Figure 1 of the drawings having a casing 1 closed at its upper end by a cover 2. An inlet 3 is located in the lower end of the casing for the introduction of the unfiltered fluid into the casing 1. An outlet 4 also passes through the lower end of the casing 1 for the discharge of the clarified fluid from the filter. The casing may be provided with a clean-out plug 6 for the removal of sludge which accumulates in the bottom of the casing.

A center tube 7 is secured to the outlet 4 in a fluid tight manner and extends upwardly toward the top of the casing 1. A flange 8 is attached to the center tube 7 near its junction with the outlet 4. A threaded collar 9 is welded in the upper end of the center tube 7 for engagement with a hollow bolt 10 passing through the cover 2 of the filter to hold it tightly in place during the operation of the filter. Leakage of the fluid being filtered between the casing 1 and the cover 2 during the filtering operation is prevented by a gasket 11 underneath the head on the bolt 10 and a second gasket 12 on the upper edge of the casing 1.

The flange 8 supports a tubular filter cartridge 13 of bonded sawdust, prepared by the method described herein, in a position surrounding the center tube 7 of the filter. The filter cartridge 13 is held firmly in place on the flange 8 by an upper flange 14 which is movable along the bolt 10. The flange 14 is urged downwardly against the upper end of the filter cartridge 13 by a compressed helical spring 15 bearing at its upper end against the lower surface of the cover 2 and its lower end against a gasket 16 of sealing material on the upper surface of flange 14. The gasket 16 is pressed against the bolt 10 by the spring to prevent flow of fluid along the outer surface of the bolt. Ordinarily, the filter cartridge 13 will be separated from the flanges 8 and 14 by gaskets 17 and 18 respectively, which prevents leakage of the unfiltered fluid past the ends of the filter block 13.

The center tube 7 is apertured at 19 along its length between the flange 8 and the collar 9 to permit flow of the filtered fluid discharged from the inner surface of the filter block 13. In some instances, it may be desirable to provide a pressure release mechanism indicated by the port 20 providing access for the unfiltered fluid from the inlet 3 to the center of the hollow bolt 10. Flow through the port 20 is prevented by a ball 21 urged against a valve 22 by a compressed spring 23 within the hollow bolt 10.

In operation, the fluid to be filtered enters the inlet 3 of the filter casing 1. The fluid then passes radially through the filter block 13 to the apertures 19 on the center tube. As the fluid passes through the filter block, the sludge and other impurities are effectively removed and the fluid entering the center tube 7 is clarified. The clarified fluid then passes from the center tube 7 to the outlet 4 to the point of use.

Since the failure of the filter block, in most instances, is the result of plugging its inlet surface, the shape of the filter block may be modified in the manner illustrated in Figure 2 of the drawings to increase its capacity. In this form of the invention, a block 25, after molding and setting, is passed over gang saws and rotated thereon to cut a series of grooves 26, separated by ridges 27, in the outer surface of the block. The total surface area is greatly increased and a corresponding increase in total dirt capacity of the filter block is obtained.

In order to prevent plugging of the inlet surface, it may be desirable to construct a filter cartridge having a highly porous section in the inlet region and a more dense section near the outlet. For example, in the preparation of a tubular filter cartridge for outside to inside filtration, a sleeve may be inserted in the mold between its inner and outer surfaces. The space within the sleeve is then filled with a mixture of relatively fine sawdust and resin, and the space surrounding the sleeve is filled with a mixture of coarse sawdust and resin. The sleeve is then withdrawn and the filter block is molded in the manner herein described to produce an efficient filter cartridge having a porous inlet area.

A novel filter medium capable of efficient clarification of lubricating oils and which may be prepared at a low cost has been described herein. The new material is resistant to continued action of hot water for extended periods. The particles of sawdust are held firmly in place by the resin to give a block which does not shrink. Moreover, migration, classification, and packing of the sawdust particles are prevented, thereby preserving the efficient filtering properties of the filter medium throughout its period of use.

While this invention has been described in detail with respect to specific compositions and structure, it is to be understood that the concept of this invention is not limited to those details, but is limited only by the scope of the appended claims.

I claim:

1. A method of manufacturing a filter medium comprising mixing sawdust with a synthetic resin, molding the mixture of sawdust and resin to the desired shape, and heating the molded sawdust at substantially constant volume to set the resin and form a unitary porous mass of sawdust particles bonded with the resin.

2. A filter device comprising a filter casing having an inlet and an outlet, a porous block of sawdust bonded with a resin, and means directing the fluid to be filtered from the inlet through the porous block to the outlet.

3. A filter device comprising a filter casing having an inlet and an outlet, a porous block of sawdust bonded with a resin having a softening temperature above 200° F., and means directing the fluid to be filtered from the inlet through the porous block to the outlet.

4. A filter device comprising a filter casing having an inlet and an outlet, a porous block of sawdust having a maximum particle size of 20 mesh bonded with a resin, and means directing the fluid to be filtered from the inlet through the porous block to the outlet.

5. A filter device comprising a filter casing having an inlet and an outlet, a porous block of sawdust bonded with about 15–50% of a synthetic resin having a softening temperature above about 200° F. and means directing the fluid to be filtered from the inlet through the porous block to the outlet.

6. A filter device comprising a filter casing having an inlet and an outlet, a porous block of sawdust bonded with a resin, and means directing the fluid to be filtered through the block, said block having a section near the outlet formed from fine sawdust and a section near the inlet formed from coarse sawdust whereby the dirt capacity of the filter block is increased.

7. A filter mass comprising sawdust particles bonded together throughout the mass with a layer of a thermosetting resin on the individual particles binding adjacent particles to form a rigid permeable mass.

8. A filter mass comprising sawdust particles bonded together with a discontinuous phase throughout the mass of a resin to form a rigid permeable mass.

9. A filter mass comprising sawdust particles, and a layer of resin on the individual particles binding adjacent particles at substantially their areas of contact to form a rigid permeable mass.

10. A filter mass as set forth in claim 7 in which the thermosetting resin constitutes approximately 15 to 50% by weight of the filter mass.

11. A filter mass as set forth in claim 7 in which the thermosetting resin constitutes approximately 15 to 25% by weight of the filter mass.

12. A filter mass comprising sawdust particles bonded together throughout the mass with a layer of a resin having a softening temperature above about 200° F. on the individual particles binding adjacent particles to form a rigid permeable mass.

13. A filter mass as set forth in claim 7 in which the sawdust particles have a maximum size of about twenty mesh.

14. A filter mass as set forth in claim 7 in which the thermosetting resin is selected from the group consisting of phenol-formaldehyde, resorcinol-formaldehyde, phenol-furfural, melamine-formaldehyde, lignin, and urea-formaldehyde fortified with melamine.

15. A filter mass as set forth in claim 7 in which the resin is phenol-formaldehyde.

16. A filter mass as set forth in claim 7 in which the resin is phenol-furfural.

17. A filter mass as set forth in claim 7 in which the resin is melamine-formaldehyde.

18. A mass produced unitary integral filter body comprising a unitary block of fibers surface bonded to each other by a thermosetting resin cured in situ and constituting an open porous structure of at least 60% porosity and of a strength and brittleness permitting the same to be sawed cleanly, said body having a series of parallel flanges defined by saw cuts extending from the inlet side of the block towards but short of the outlet side whereby said flanges are all integrally connected together at their inner ends.

References Cited in the file of this patent

UNITED STATES PATENTS

| | | |
|---|---|---|
| 1,162,244 | Kistee | Nov. 30, 1915 |
| 1,884,366 | Sutherland | Oct. 25, 1932 |
| 1,885,066 | Warren | Oct. 25, 1932 |
| 1,877,864 | Hawerlander | Sept. 30, 1932 |
| 1,902,461 | Novotny | Mar. 21, 1933 |
| 2,007,052 | Howe | July 2, 1935 |
| 2,063,086 | Fitz Gerald | Dec. 8, 1936 |
| 2,077,512 | Buchloh | Apr. 20, 1937 |
| 2,140,189 | Mason | Dec. 13, 1938 |
| 2,237,148 | Carter | Apr. 1, 1941 |
| 2,337,574 | Sloan | Dec. 28, 1943 |
| 2,349,469 | Sloan | May 23, 1944 |
| 2,398,284 | Briggs | Jan. 25, 1946 |
| 2,468,328 | Hill | Apr. 26, 1949 |
| 2,539,768 | Anderson | Jan. 30, 1951 |
| 2,554,814 | Catlin et al. | May 29, 1951 |
| 2,563,897 | Wilson | Aug. 14, 1951 |

OTHER REFERENCES

Modern Plastics, pages 89–91, September 1947.